Jan. 5, 1937.   H. F. PHILLIPS   2,066,484
SCREW
Filed Jan. 15, 1935

HENRY F. PHILLIPS.
INVENTOR.

BY James D. Givnan
ATTORNEYS.

Patented Jan. 5, 1937

2,066,484

UNITED STATES PATENT OFFICE 2,066,484

SCREW

Henry F. Phillips, Portland, Oreg., assignor to Phillips Screw Company, Wilmington, Del.

Application January 15, 1935, Serial No. 1,945

4 Claims. (Cl. 85—45)

This invention relates to improvements in tool receiving recesses formed in the heads of screws.

The principal object of the invention is the provision of a recess of this character having side walls and adjacent tool receiving channelways all of curvilinear formation and all formed on equal radii.

Another object of the invention is the formation of such a recess wherein all of said side walls and grooves taper uniformly from their top to bottom edges.

In recesses of this general character heretofore provided in screw heads, the side walls and tool receiving grooves have been of definite angular formation presenting sharp edges which when being presented to a tool of corresponding shape, are susceptible to mutilation and damage due to relative movement between the bit end of the driver and the recess when centralizing themselves with respect to each other.

In my new and improved form of recess I overcome these objectionable features by providing a recess formed with smooth rounded surfaces and wherein the desirable virtues of a tool receiving socket are preserved.

These and other objects will appear as my invention is more fully hereinafter described in the following specification, illustrated in the accompanying drawing and finally pointed out in the appended claims.

Figure 1:
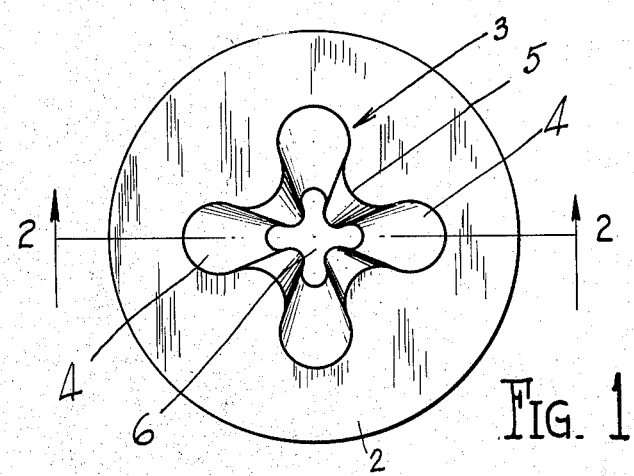
Figure 1 is a top plan view of a screw head showing my new and improved recess formed therein.
Figure 2:
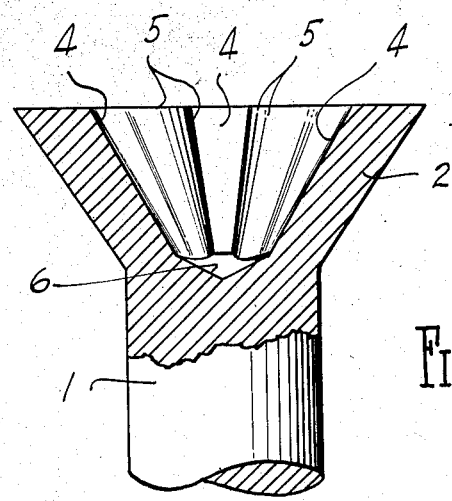
Figure 2 is a sectional side elevation of Figure 1 taken on the line 2—2 of Figure 1.

Referring now more particularly to the drawing—

Reference numeral 1 indicates the body of a screw formed with a head 2, and while I have shown a flat head, it is to be understood that the invention readily lends itself to any other type of screw head.

The tool receiving recess is generally indicated at 3 and consists of concave tool receiving grooves 4 which merge with convex side walls 5. The radius of each tool receiving groove is equal to the radius of each convex side wall and each groove and side wall tapers uniformly in the direction of the length of the screw and terminates in a bottom wall 6 which is preferably concave and identical in outline to the uppermost end of the recess.

What is claimed is:

1. A screw having a head, a tool receiving recess formed in said head, said recess comprising a bottom wall, convex side walls merging with concave and radially extending tool receiving grooves, said side walls and grooves being of equal width and tapering uniformly toward the bottom wall of said recess.

2. A screw having a head, a tool receiving recess formed in said head and having a bottom wall terminating within the shank of said screw, the bottom wall being identical in shape with the outermost edges of the recess, said recess comprising diametrically opposed convex side walls and diametrically opposed concave tool receiving grooves, the walls and grooves being of equal width, said side walls and grooves terminating within the head of said screw, and the lowermost point of the bottom wall terminating in the shank of the screw.

3. A screw having a head, a tool receiving recess formed in said head, said recess comprising convex side walls merging with radially extending concave tool receiving grooves, said grooves and said side walls being of equal width and uniformly tapering in the direction of their length and merging into a convex bottom identical in outline with the outermost edges of said recess.

4. A screw having a head, a tool receiving recess formed in the head, said recess consisting of convex side walls merging with radially extending concave tool receiving grooves, the radius on which said side walls are formed being equal to that on which said grooves are formed throughout the depth of the walls and grooves, and said walls and grooves tapering uniformly toward the longitudinal axis of the screw.

HENRY F. PHILLIPS.